March 22, 1966        M. JENNER        3,241,477
INJECTING DEVICE
Filed Nov. 30, 1962        2 Sheets-Sheet 1
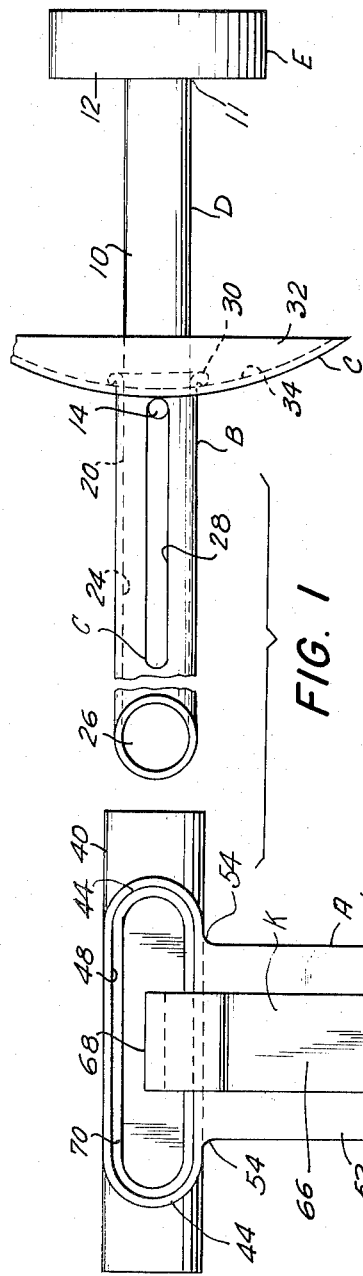
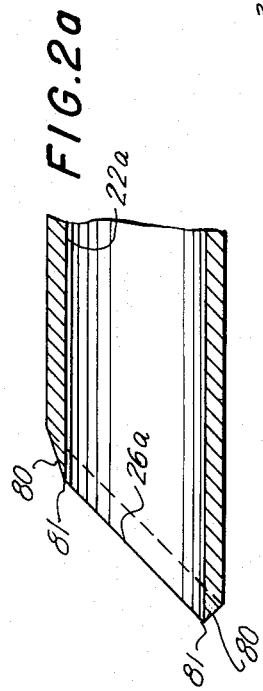
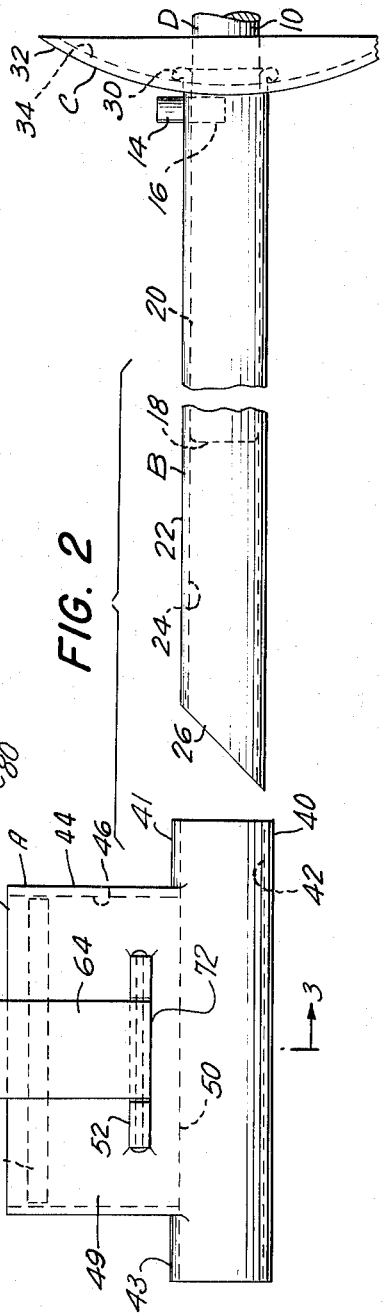
INVENTOR.
MYRON JENNER
BY
ATTORNEY March 22, 1966 M. JENNER 3,241,477
INJECTING DEVICE
Filed Nov. 30, 1962 2 Sheets-Sheet 2
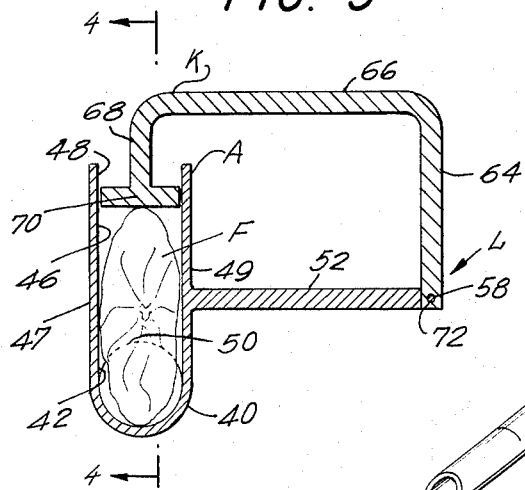
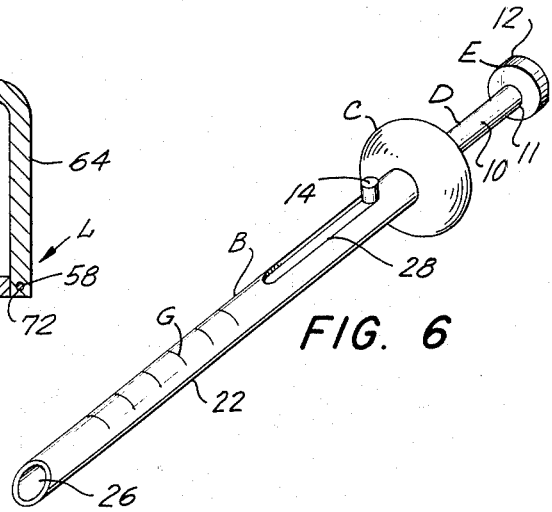
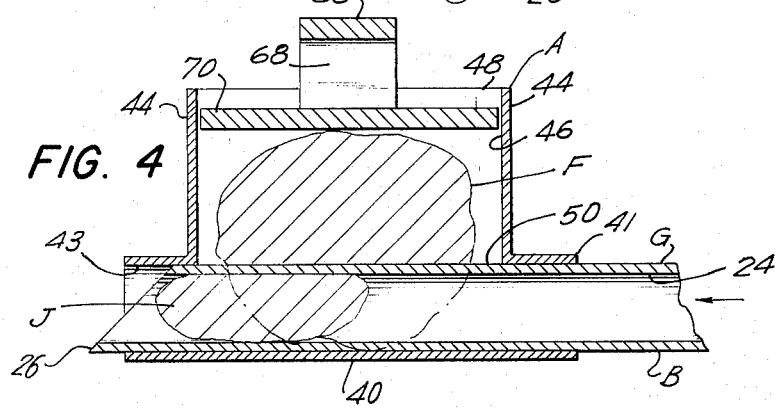
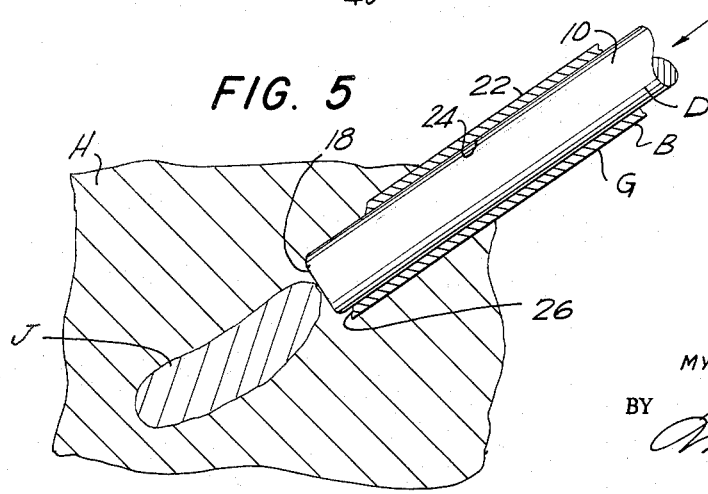
INVENTOR.
MYRON JENNER
BY
ATTORNEY

United States Patent Office 3,241,477
Patented Mar. 22, 1966

3,241,477
INJECTING DEVICE
Myron Jenner, Bethel, Vt.
(38 Park Row, New York, N.Y.)
Filed Nov. 30, 1962, Ser. No. 241,281
1 Claim. (Cl. 99—345)

The present invention relates to an injecting device, and it particularly relates to an injecting device for use with food products.

Although not limited thereto, the present invention will be particularly described in its application to injecting various types of materials into meat, such as the injection of garlic, fats and the like in small particles.

It is among the objects of the present invention to provide an injection device which will be a relatively simple construction and which may be readily used for the injection of various types of flavoring or additive materials into meat in a relatively simple and effective fashion.

Another object is to provide a garlic injector particularly designed for meat in which the flavoring material such as garlic may be injected into the meat so as to flavor the same during its cooking, roasting or other preparation.

A still further object is to provide a garlic injector for meat in which it will be possible to treat meat with garlic during preparation thereof with the use of solid fresh garlic and without the need of previous dehydration and without the need of handling the garlic to assure adequate garlic flavor.

Still further objects and advantages will appear in the more detailed description set forth below, it being understod, however, that this more detailed description is given by way of illustration and explanation only and not by way of limitation, since various changes therein may be made by those skilled in the art without departing from the scope and spirit of the present invention.

In accomplishing the above objects, it has been found most satisfactory according to one embodiment of the present invention to provide a garlic injector having an elongated cylindrical member or injection tube to cut off and receive the garlic particles and then to inject such particles into the body of the meat to be cooked, broiled or roasted.

The elongated cylindrical member or injection tube is also provided with a central reciprocatory piston or expulsion member which will cause the piece of garlic to be removed from the tube thereof and injected into the meat and left within the meat body.

The main injection tube is desirably provided with a garlic dispensing receptacle which will hold a relatively large piece of fresh garlic and permit cutting off of pieces thereof by the elongated cylindrical member and then injection thereof into the body of the meat to be treated.

Desirably, the garlic dispensing receptacle may have an enclosure for the piece of fresh garlic in which and through which the injection tube may be inserted.

In one form, the receptacle consists of a parallel walled member having an open top and partial end wall closure and a half cylindrical bottom.

The bottom is provided with tubular in let and outlet extensions through which and into which the injection tube may be inserted.

These tubular inlet and outlet extensions form guide members into which and through which the injection tube is positioned to pick up and inject a piece of garlic into the meat body to be treated.

The injection tube may be graduated so as to indicate the depth of insertion and the place where the garlic will be deposited. The injection tube is provided with a slot cooperating with a projection stud or pin from the piston or expulsion member to limit the reciprocation of such piston or expulsion member.

Desirably, handle or manual manipulating means are provided at one end attached to the injection tube as well as the piston or expulsion member to permit these members to be moved relatively to one direction as well as to permit the injection tube to be moved through the receptacle with the piece of garlic being first cut off in the receptacle and then injected into the meat body by the injection tube and finally discharged from the injected tube by movement of the piston or expulsion member.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a top separated plan view of the cylindrical injection tube with its reciprocating piston and the garlic dispensing receptacle.

FIG. 2 is a side elevational view of the arrangement of FIG. 1.

FIG. 2a is a fragmentary transverse sectional view showing an alternative form of the invention in which the injection tube is provided with a bevelled cutting edge.

FIG. 3 is a transverse sectional view taken upon the line 3—3 of FIG. 2.

FIG. 4 is a fragmentary longitudinal sectional view showing the injection tube in position within the receptacle taken upon the line 4—4 of FIG. 3.

FIG. 5 is a fragmentary longitudinal sectional view showing the fragment of garlic injected into the meat body.

FIG. 6 is a top perspective view of the injector with the piston and cylindrical member in the position in which they are shown in FIGS. 1 and 2 and upon a reduced scale as compared to FIGS. 1 and 2.

Referring to FIGS. 1 to 6, there is shown a garlic dispensing receptacle A and an elongated cylindrical member B to receive and inject the garlic particles.

The cylindrical member or injection tube B has the manual manipulating or handle member C at one end thereof and it receives the reciprocatory piston D having the handle member or manual manipulating means E.

The piece of garlic F is held within the receptacle A to be cut off and thereafter injected by the tubular member B.

The cut off particle J of garlic may be injected into the body of the meat as indicated at H as best shown in FIG. 5.

Referring particularly to FIG. 1, the piston D has the cylindrical closely fitting face 10 at its rear end which may have the disk 12 forming the handle E which may be joined thereto at 11.

The cylindrical face 10 of the piston member D has the stud 14 projecting outwardly therefrom and fitted in the recess 16 (see FIG. 2).

The end of the piston D has the smooth ejection face 18 which is normally positioned well to the right as shown in FIG. 2 except when the garlic piece J is to be injected into the meat body H as shown in FIG. 5.

The outside cylindrical face 10 of the piston member D may somewhat loosely fit within the inside face 20 of the tubular body 22, but it should very closely fit the inside cylindrical face 24 of the tubular body 22 where it is actually inserted in the meat body H.

This will permit relatively free movement in the portion of the tubular member 20 where there is no cutting or injection and relatively close fitting and close movement at 24 where there is close cutting and injection.

The end of the tubular body 22 may be bevelled off as indicated at 26 so as to spread the meat when a piece of garlic J is injected into the body of the meat H.

The slot 28 in the tubular member B will receive the stud 14 and will limit the movement of the piston D in respect to the cylinder B from the position as shown in FIGS. 1, 2 and 6 where the piston D is moved fully to the right and the alternative position of FIG. 5 where the piston D is moved fully to the left in the final ejection operation.

The tube 22 at its left end may be held onto the manual manipulating means or handle C by means of the inturned bead 30 which fits inside of and presses against the face 34 of the partial spherical shield 32 from the manual member C.

Referring to the garlic dispensing receptacle A, there is provided the rounded bottom 40 having the guide surface 42 and the tubular member 22.

The bottom 40 has the inlet and outlet portions 41 and 43 acting to receive and guide the tubular member G when inserted in the lower part of the receptacle A.

The receptacle A has the end walls 44 which may be rounded and the side walls 47 and 49 which form an interior 46 of the receptacle A within which the piece of garlic F may be inserted.

The upper portion 48 may be open and serves to receive pieces of garlic inserted therein.

As shown best in FIGS. 2, 3 and 4, the piece of garlic J may be cut off by the tube B along the line 50 adjacent the lower portion of the chamber 46 and above the tubular guide portion or area 42 which receives the tubular member B.

To press the piece of garlic downwardly, there may be provided a presser member K having a hinged structure L.

The hinged structure L is mounted on a horizontal plate 52 mounted at 54 on the vertical wall 49 of the receptacle A.

The horizontal plate 52 is recessed at 56 to receive the lower end 72 of the presser member K which is pivotally mounted on the pin 58 having the enlarged head 60 and extending through the sides of the plate 52 through the opening 62.

The pivotal portion 72 is at the lower end of the rear member 64 of the presser element K.

The presser member K has the forwardly extending portion 66 which terminates in the downward extension 68 and the terminal presser plate 70 which when pressed down on the garlic F causes it always to be in the path in the inserted tubular member B as indicated in FIG. 4.

The terminal presser plate 70 may be readily inserted in the mouth 48 of the receptacle A and there should be sufficient clearance that it will be capable of up and downward movement without contacting the walls 44, 47 and 49.

The dispensing receptacle of FIGS. 1 to 4 may be made of plastic or a lightweight noncorrosive metal and the presser element K as well as the receptacle structure A may be former independently and then connected together by the hinge pin 58.

The tubular member B is desirably of a thin yet relatively rigid metal or plastic tubing which is sufficiently sharp to readily cut through the garlic F and be readily injected into the body of meat H.

Where the tubing is somewhat thicker, the ends at the mouth 26a as shown in the alternative form of FIG. 2a may be bevelled as indicated at 80 so as to form a sharp cutting edge at 81 to permit ready cutting into and through the body of the garlic particle F and the body of the meat H.

In operation, the piston member is usually drawn to the right so that the stud or pin 14 will be at the right hand end of the slot 28 as shown in FIGS. 1, 2 and 6.

Then with the handle portion C while pressing down the plate 70, the injection tube may be inserted through the guide members 41 and 43 to cut off a lower portion of the garlic F as indicated at J in FIG. 4.

With this in position in the tube, the lower portion of the tube B may then be inserted in the body of the meat H and the garlic particle J injected into the meat and the tube B and piston D may be withdrawn to the position as shown in FIG. 6.

All this may be done with fresh garlic and without contact with the hands and as many portions as desired may be inserted with the measurement being given by the lower graduation portion G of the tube B.

This will permit insertion of the solid fresh garlic into the meat without the need of dehydration and without any contact.

It is not necessary to cut the garlic up nor to grade it and the garlic may be inserted to the desired depth and in the desired places in the meat body.

It is not necessary to scoop out the meat, and it is possible to leave the whole body of garlic within the subsequent boiling, cooking or roasting operation.

If desired, however, by proportioning the piston D so as to extend well beyond the tube B in the position of FIG. 5 it is possible to compress the piece of garlic J and express any juices therefrom that may be desired directly in the body of the meat.

Normally, during the insertion procedure, the piston D may be held directly up against the cut off pieces of garlic J with the cut off pieces of garlic J being directly at the outlet of the tube B so that the meat will not enter the tube and so that the tube may be easily inserted to any depth.

The final ejection will consist of moving the piston D beyond the end of the mouth 26 of the tube B with the subsequent compression of the garlic pieces J.

This may also be used for larding meat or for application of tenderizers or for injection of the other types of material into various foods to be roasted, cooked, broiled or the like.

The injector may be made of plastic, such as nylon, butyrate, Teflon, as well as of metal such as stainless steel tubing.

The injector may be used to inject solid or granular meat tenderizer into the body at varying depths.

Full value of the garlic or tenderizer is achieved since it is inserted within the body of the meat keeping the aroma internally without loss due to evaporation or burning when used externally.

The graduations desirably measure the depth of insertion and positon of the inserted material. When transparent materials are used, the graduations may be used roughly to measure the amount of the charge inserted.

The tube should be operated so that the meat is not forced up into the tube. This is done by suitably placing the cut off material to be inserted and the plunger at the lower exit end of tube to fill the same.

With the positioning of the fingers above the handle C and the other finger or thumb above the handle E, it is possible to compress the garlic for juices or remove the injector and leave garlic in an uncompressed state for slow flavoring.

When the fingers are placed below the handle C and the thumb is placed above the handle E, the injector is readilly removed from the meat body.

As many changes could be made in the above injecting device, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

An injector for garlic and other similar flavoring materials into meats and foods for flavoring the same during roasting, potting, broiling and other cooking operations comprising a receptacle having a central enclosure structure to receive the material and inlet and outlet guide passageways aligned with the bottom part of the enclosure structure, whereby a portion, at least, of said material is positioned in the bottom of said enclosure structure between said passageways, an elongated cutting and injection tube inserted into said guide passageways to cut off a piece of said material and remove it from the receptacle, a reciprocatory piston within said injection tube to remove the piece of material and inject the piece of material into the body of the food upon insertion of the injection tube thereinto, said receptacle having a presser member consisting of a presser plate and a hinged structure for said presser plate positioned on one side of said receptacle, and having a manual member enterable within said enclosure structure to permit pressure upon the material to press it into the bottom of the receptacle between said passageways.

References Cited by the Examiner

UNITED STATES PATENTS

| | | | |
|---|---|---|---|
| 341,357 | 5/1886 | Sterling | 99—257 |
| 774,394 | 11/1904 | Peter | 99—257 |
| 925,162 | 6/1909 | Dechert | 17—42.1 |
| 1,883,829 | 10/1932 | Skoverski | 107—1.1 |
| 2,887,035 | 5/1959 | De Seversky | 99—234 |
| 3,088,207 | 5/1963 | Borsuk | 32—60 |

WALTER A. SCHEEL, *Primary Examiner.*

JEROME SCHNALL, *Examiner.*